(No Model.) 2 Sheets—Sheet 1.
W. J. EDWARDS.
SAFETY BICYCLE.
No. 475,444. Patented May 24, 1892.
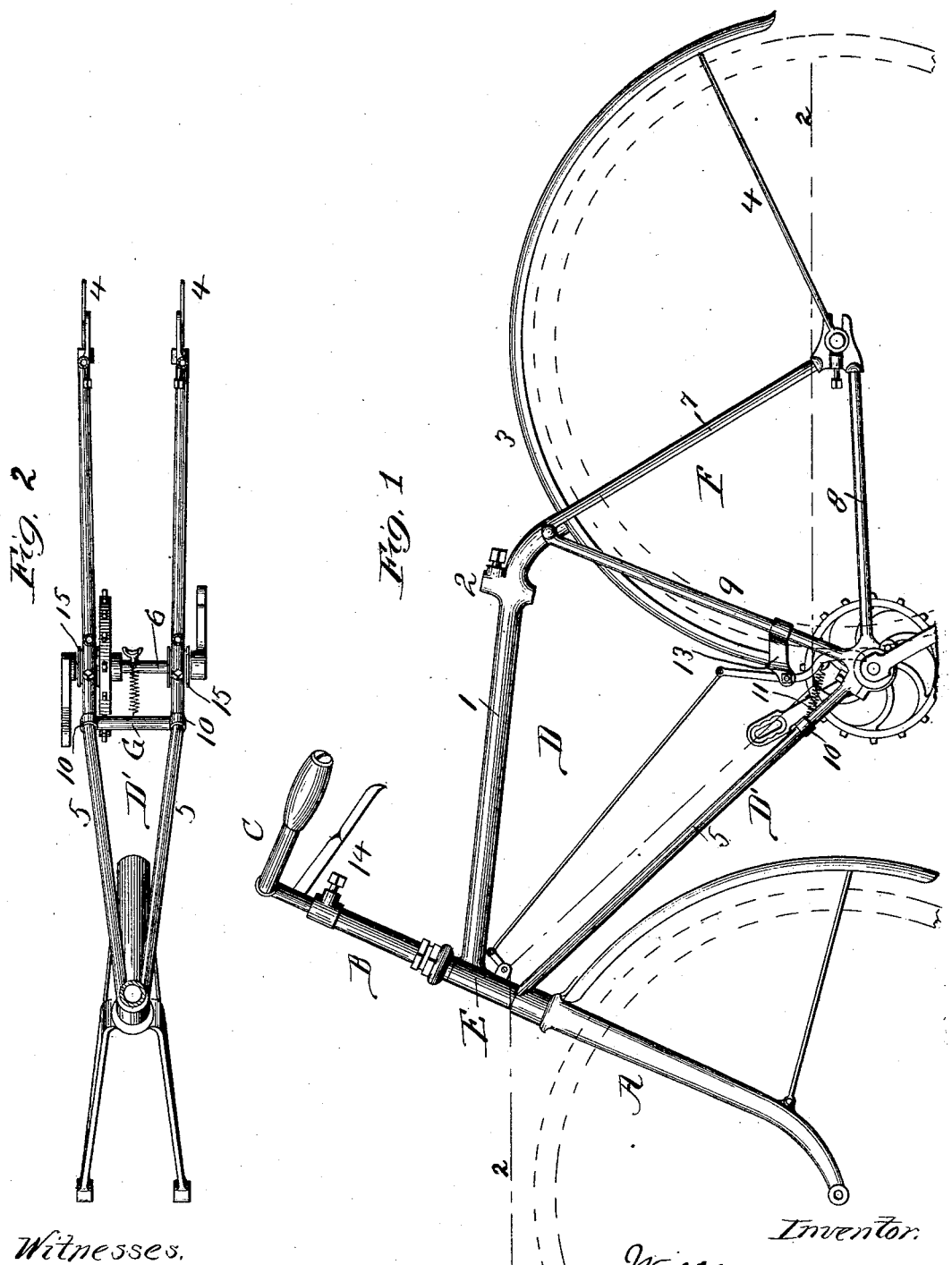
Witnesses.
Fred'k H. Mills.
Margaret M. Wagner.
Inventor.
William J. Edwards
By Chas. G. Page
Atty.

(No Model.) 2 Sheets—Sheet 2.
W. J. EDWARDS.
SAFETY BICYCLE.
No. 475,444. Patented May 24, 1892.
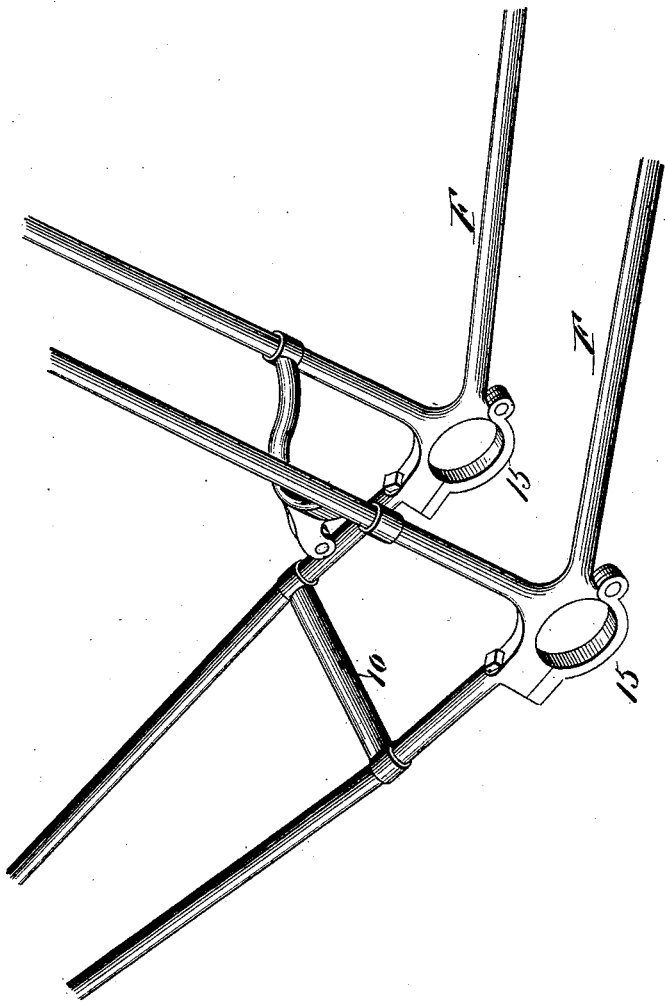
Witnesses
Fredk. H. Mills.
Margaret M. Wagner
Inventor
William J. Edwards
By. Chas. G. Page
Atty.

UNITED STATES PATENT OFFICE.

WILLIAM J. EDWARDS, OF CHICAGO, ILLINOIS, ASSIGNOR TO THE UNION MANUFACTURING AND PLATING COMPANY, OF SAME PLACE.

SAFETY BICYCLE.

SPECIFICATION forming part of Letters Patent No. 475,444, dated May 24, 1892.

Application filed June 22, 1891. Serial No. 397,018. (No model.)

*To all whom it may concern:*

Be it known that I, WILLIAM J. EDWARDS, a citizen of the United States, residing at Chicago, in the county of Cook and State of Illinois, have invented a certain new and useful Improvement in Safety Bicycles, of which the following is a specification.

My invention relates to a construction of Safety bicycles involving a diamond-shaped body-frame, and has for its objects to render the body-frame strong, light, and durable; to permit a serviceable disposition of the driving-sprocket and bearings for its axle, and to provide certain details serving to generally increase the serviceability of Safety bicycles.

To the attainment of the foregoing and other useful ends my invention consists in matters hereinafter set forth, and particularly pointed out in the claims.

In the accompanying drawings, Figure 1 represents in side elevation the greater portion of a Safety bicycle embodying my invention. Fig. 2 is a section on line 2 2 in Fig. 1. Fig. 3 is a perspective of a portion of the body-frame.

In said drawings, A indicates the fork, which straddles the front wheel, and B denotes the steering head or standard, which is at its lower end provided with the fork and at its upper end provided with the handle-bar C. The reach or body-frame D, which extends from the socket-bearing E for the steering-head back to the rear axle, is made proximately diamond shape, as illustrated in Fig. 1, and so divided that it can straddle the rear wheel and connect with its axle-bearings at opposite sides of the machine. The upper portion of the body-frame comprises a rod or tube, which serves to provide the seat-supporting backbone 1. This backbone is at its forward end rigidly united with the socket-bearing E for the steering head or rod, and at its rear end connected with and supported by a couple of triangular frames F, which are arranged, respectively, at opposite sides of the rear wheel. These triangular frames are at their lower rear corners rigid with the supports or bearings for the rear axle, and at their upper corners or apices are rigidly secured to opposite sides of the rear end portion of the backbone. The backbone is provided at a suitable point forward of its connection with the triangular frame F with a socket 2 for the seat-standard. The mud-guard 3 for the rear wheel is attached to the rear end of the rod or tube 1, and is further supported and steadied from the rear-axle bearings by brace-rods 4.

The lower portion D' of the diamond-shaped frame is divided throughout its length, and has its sides or divisions 5 arranged to converge from the driving-sprocket axle toward the socket-bearing E, with which latter they are rigidly united. The rear ends of said sides 5 of the lower portion of the body-frame meet and connect with the lower forward corner portions of the triangular frames F, said members being at their points of junction secured to the supports or bearings for the driving-sprocket axle 6, said supports or bearings being desirably made as hangers 15, in which the bearings proper for the axle can be clamped, so as to rigidly hold the frame members and bearings together. The driving-sprocket is arranged between these said supports or bearings, and hence is within the space between the two sides of the body-frame, each of said sides being formed by one of the triangular frames F and one of the lower side portions 5 of the body-frame. These triangular frames constitute important elements in the construction of the frame and permit me to dispense with the old and less desirable arrangement of a seat-pillar tube forked at its lower end portion, so as to provide space for the sprocket-wheel. The rigid frames F provide a simpler and more rigid construction and brace and support the seat-supporting backbone in a better way, being at their lower rear corners supported by the rear axle and at their upper corners secured to opposite sides of the rear end portion of the backbone, so as to more effectively hold and support the backbone against torsional strain and rigidly hold said end portion of the backbone which terminates over the forward portion of the single rear wheel, and at the same time each frame affords two rods or tubes 8 and 9, which, together with one of the lower side portions 5, converge at one of the bearings for the sprocket-axle.

By the foregoing arrangement the rear sides 7 of the triangular frames practically constitute rear extensions of the upper portion 1 of the body-frame, while the bottom sides or base portions 8 of said frames form rear extensions of the sides 5 of the lower divided portion D' of the body-frame. The forward sides 9 of the triangular frame serve as struts or braces between the upper and lower portions of the body-frame and rise from the sprocket-axle bearings to the upper portion 1 of the body-frame. The triangular frames practically form the sides of the rear divided portion of the body-frame, which is also divided entirely along its lower portion, of which the forward part D' extends from the steering-head bearing back to the sprocket-axle bearings, while its rear part, which extends from the sprocket-axle bearings to the rear-axle bearings, is formed by the two triangular frames F.

At a point forward of the rear ends of the sides 5 of the lower portion of the body-frame I provide a cross-brace G, having at its ends eyes 10, which are fitted upon said sides 5. This cross-brace G is forward of the bearings, with which the rear ends of sides 5 are connected, and is substantially over the forward portion of the driving-sprocket H. This cross-brace G serves as a stay for the entire divided lower portion of the body-frame, since the triangular frames, which enter into the formation of such lower portion of the body-frame, are rigid with the sides 5. The sides of the lower divided portion of the body-frame are by the provision of the cross-brace G prevented both from spreading apart and from being forced toward one and another in the event of the machine falling upon one of its sides.

In addition to forming a simple and light device for bracing the body-frame the cross-brace G also serves as a holder for the forward end of a spring 11, which is at its rear end attached to a brake 12 for the rear wheel. The brake is pivotally supported upon a bracket 13 on the sides 9 of the triangular frames F and is operated from a lever 14 through the medium of suitable connections. It will also be observed that the cross-brace G serves to steady and maintain the bearings 15 for the sprocket-axle 6 at an invariable distance apart, since said bearings are held by the sides of the lower divided portion of the body-frame. By such arrangement, also, in place of a long bearing for the axle 6, I can use with security the two bearings 15. This arrangement of the divided lower portion of the body-frame also permits the driving-sprocket to be arranged between the two sides of said divided portion, and hence the said sides practically form guards for the sprocket.

With further reference to my improved construction it will be noted that the single seat-supporting reach or backbone terminates at its rear end over the forward portion of the single rear driving-wheel and supports the seat at a point forward of the point whereat the two triangular frames F have their upper corners rigidly secured to the reach, thereby avoiding various mechanical difficulties and objections to the securement of a single backbone to the upper end of the tubular seat-pillar as proposed in English Letters Patent No. 16,723 of 1887, in contradistinction to which construction I provide two separately-formed triangular frames F, which have their upper corners or angles secured directly to the single reach. By employing these two triangular frames as a support for the backbone at a point forward of the rear wheel and back of the point whereat the backbone supports the seat-standard, I dispense with a seat-pillar and can secure the said frames to opposite sides of the backbone, so as to more effectively hold the same against torsion and also avoid the undesirable feature of adapting the backbone at such point for a seat-standard and simply make the backbone at said point with reference to the securement thereto of the upper corners of the triangular frames.

What I claim as my invention is—

1. A Safety bicycle comprising the seat-supporting backbone rigid at its forward end with the socket for the steering rod or head and at its rear end terminating over the single rear wheel, the two rigid triangular frames F, arranged at opposite sides of the rear wheel and having their lower rear corner portions supported by the rear axle, their respective upper corner portions secured to the rear end portion of the backbone and their forward lower corner portions rigid with hangers or bearings for the sprocket-axle, the lower frame portion having sides 5 rigid with and diverging rearwardly from the socket for the steering-head and also rigid with the hangers or bearings for the sprocket-axle, the sprocket being arranged between said hangers or bearings, substantially as described.

2. The combination, with a longitudinally and vertically divided bicycle-frame constructed with members 5, 8, and 9 of its side portions converging at oppositely-arranged hangers or bearings for the sprocket-axle, substantially as described, and carrying a sprocket-wheel between said hangers or bearings, of the horizontally-arranged cross-brace and stay G, rigidly secured to the rearwardly-diverging members 5 of the lower side portions of the divided body-frame just forward of the sprocket-wheel, substantially as and for the purpose set forth.

3. In a Safety bicycle, the combination of the diamond-shaped frame D, having a divided lower portion, the cross-brace G, applied as set forth, the brake, and a spring for the brake attached to said cross-brace, substantially as described.

WILLIAM J. EDWARDS.

Witnesses:
MARGARET M. WAGNER,
FREDK. H. MILLS.